United States Patent Office 3,341,525
Patented Sept. 12, 1967

3,341,525
5α,16α,17α-TRIHYDROXY-6β-HALOPREGNANE-
3,20-BISETHYLENE KETALS
Josef Fried, Princeton, N.J., assignor, by mesne assignments, to E. R. Squibb & Sons, Inc., New York, N.Y., a corporation of Delaware
No Drawing. Filed Dec. 16, 1959, Ser. No. 859,840
2 Claims. (Cl. 260—239.55)

This invention relates to, and has for its object the provision of a method for preparing physiologically active steroids, and to the physiologically active steroids produced thereby.

The steroids of this invention include the 16α,17α-acetal and ketal derivatives of 6-halo-16α,17α-dihydroxyprogesterones and ketones or aldehydes, wherein halo is either fluoro or chloro, and more particularly steroids of the general formula

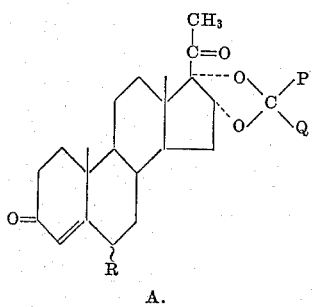
A.

wherein R is either chloro or fluoro in either the alpha or beta position; and P and Q are hydrogen, lower alkyl, halogenated lower alkyl, monocyclic cycloalkyl, monocyclic aryl, monocyclic aryl lower alkyl, monocyclic heterocyclic, or monocyclic heterocyclic alkyl; or together with the carbon atom to which they are joined P and Q is cycloalkyl or monocyclic heterocyclic.

The compounds of this invention are prepared, in accordance with the process of this invention, by interacting a steroid reactant of the general formula

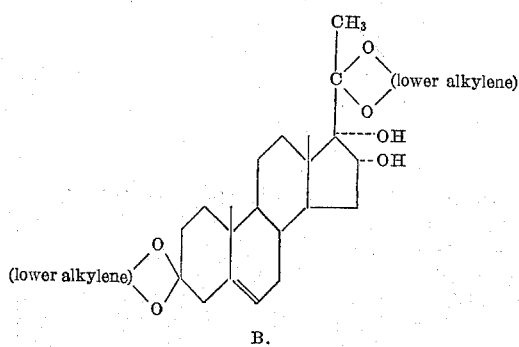
B.

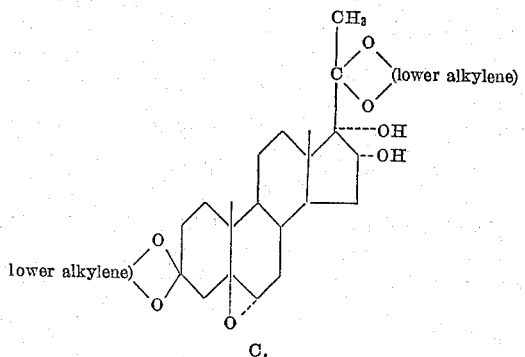
C.

The 5α,6α-epoxy derivatives are then treated with a halogenating agent such as boron trifluoride or boron trichloride to yield the corresponding new 6β-halo-5α-hydroxy derivatives of this invention having the formula

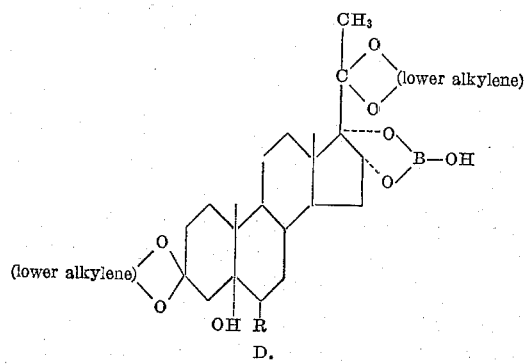
D.

wherein R is as hereinbefore defined. The reaction is preferably conducted in an organic solvent system for both the steroid and halogenating reagent at any normal temperature, such as ambient temperature.

The ketal groups in the 3 and 20 positions and the cycloborate group in the 16, 17 position are then hydrolyzed by treatment with an acid, such as a mineral acid (e.g., sulfuric and perchloric acid) to yield the corresponding 6β-halo-pregnane-5α,16α,17α-triol-3,20-diones of this invention having the formula

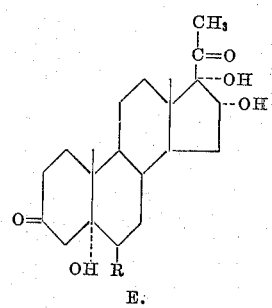
E.

wherein R is as hereinbefore defined. Alternatively, the 6β-halo-pregnene-5α,16α,17α-triol-3,20-diones of this invention may be prepared from the cycloborates of Formula D by a two-step process comprising first the formation of the lower alkyl ester by treatment with a lower alkanol to form the compounds having the formula

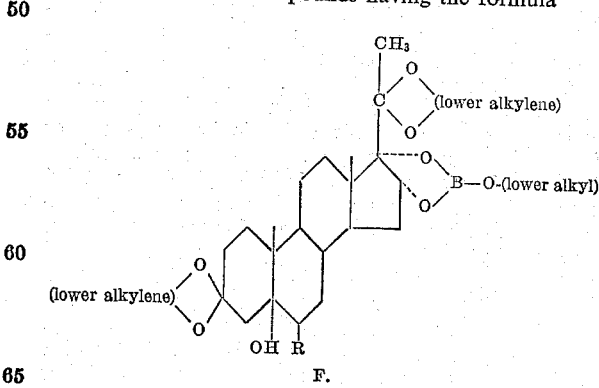
F.

wherein R is as hereinbefore defined; and second, the hydrolysis of the compound of Formula F, using a strong acid such as sulfuric or perchloric acid to yield the desired compounds of Formula E. The reaction to form Compound E is preferably conducted in an organic solvent for the steroid.

If an aldehyde or ketone is chosen as the solvent, then simultaneous hydrolysis and acetalization or ketalization occurs, thereby forming compounds having the formula

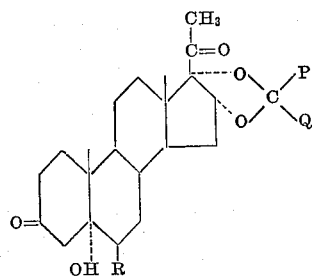

G.

wherein P, Q and R are as hereinafter defined.

If an inert organic solvent, such as a lower alkanol (e.g., methanol) is employed in the original hydrolysis, then the resulting 3,20-diketo steroids of Formula E can be acetalized or ketalized in the 16,17-position by treating with the desired aldehyde or ketone, preferably in the presence of an acid catalyst (e.g., perchloric acid, p-toluenesulfonic acid and hydrochloric acid), neutralizing the acid and recovering the acetal or ketal derivative of Formula G formed.

In either event, among the suitable aldehydes and ketones may be mentioned aldehydes such as paraldehyde, propanal, chloral hydrate, trifluoroacetaldehyde hemiacetal, heptafluorobutanal ethyl hemiacetal and hexanal; di(lower alkyl) ketones, such as acetone, diethylketone, dibutylketone methylethylketone, and methylisobutylketone; halogenated di(lower alkyl)ketones, such as 1,1,1-trifluoroacetone; mono and dicycloalkyl ketones, such as cyclohexylmethyl ketone and dicyclopropyl ketone; cycloalkanones, such as cyclobutanone, cyclopentanone, cyclohexanone, suberone, and cyclodexanone; monocyclic aromatic aldehydes such as benzaldehyde, halobenzaldehydes (e.g., p-chlorobenzaldehyde and p-fluorobenzaldehyde), lower alkoxy benzaldehydes (e.g., o-anisaldehyde), di(lower alkoxy) benzaldehydes (e.g., veratraldehyde), hydroxybenzaldehydes (e.g., salicyaldehyde), dihydroxybenzaldehydes (e.g., resorcylaldehyde), lower alkyl benzaldehydes (e.g., m-tolualdehyde and p-ethylbenzaldehyde), di(lower alkyl)benzaldehydes (e.g., o,p - dimethylbenzaldehyde), nitrobenzaldehydes, acylamidobenzaldehydes (e.g., N-acetyl-anthranilaldehyde), and cyanobenzaldehydes; monocyclic aromatic lower alkanals, such as phenylacetaldehyde, α-phenylpropionaldehyde, β - phenylpropionaldehyde, γ - phenylbutryaldehyde, and aromatically-substituted halo, lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; and monocyclic heterocyclic lower alkanals, monocyclic aromatic ketones, such as acetophenone, propiophenone, butyrophenone, valerophenone, isocaprophenone, halophenyl lower alkyl ketones (e.g., p-chloroacetophenone and p-chloropropiophenone), (lower alkoxy)phenyl lower alkyl ketones (e.g., p-anisyl methyl ketone), di(lower alkoxy)phenyl lower alkyl ketones, hydroxyphenyl lower alkyl ketones, dihydroxyphenyl lower alkyl ketones (e.g., resacetophenone), (lower alkyl)phenyl lower alkyl ketones (e.g., methyl p-tolyl ketone), di(lower alkyl)phenyl lower alkyl ketones (o,p-xylyl methyl ketone), nitrophenyl lower alkyl ketones (e.g., p-nitroacetophenone) acylamidophenyl lower alkyl ketones (e.g., acetylanilines), and cyanophenyl lower alkyl ketones; benzophenone, and mono or bis substituted halo, lower alkoxy, hydroxy, lower alkyl, nitro, acylamido and cyano derivatives thereof; monocyclic aromatic lower alkanones, such as 1-phenyl-3-butanone and 1-phenyl-4-pentanone, and aromatically substituted derivatives thereof; monocyclic heterocyclic ketones such as 2-acetylfuran, 2-benzoyl furan, and 2-acetylthiophene; monocyclic heterocyclic lower alkanones; and monocyclic heterocyclic ketones, such as alloxan.

The resulting 16,17-cyclic acetal or ketal derivative of 6β-(halo)pregnane-5α,16α,17α-triol-3,20-dione is then dehydrated by treatment with a dilute base (e.g., sodium hydroxide and sodium carbonate) in an inert solvent at ambient temperature or with an acid chloride (such as $SOCl_2$ and $POCl$) in a tertiary base (such as pyridine) preferably in the cold (e.g., at 0° C.) to yield the corresponding 16,17-cyclic acetal or ketal derivative of 6β-halo-16α,17α-dihydroxyprogesterone, final products of this invention having the general formula

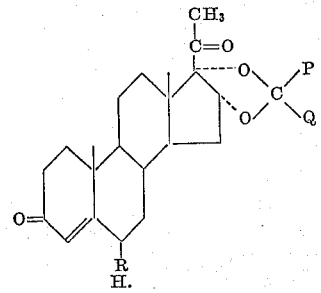

H.

wherein P, Q and R are as hereinbefore defined.

To prepare the 6α-halo derivatives of this invention, the 6β-halo group is inverted. This inversion can be accomplished by a number of methods. In accordance with one method, the 6β-halo steroid is treated with hydrogen chloride in an organic medium. In accordance with another method, the 6β-halo steroids of Formula F and G are treated directly with hydrogen chloride in an organic medium such as acetic acid, to simultaneously invert the β-halo radical, hydrolyze any 3,20-ketal groups and form the 4,5-double bond thereby yielding the final products of this invention having the formula

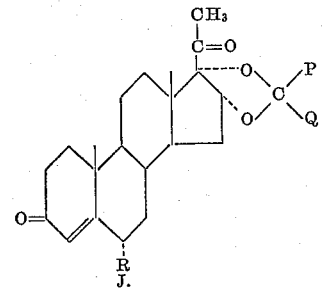

J.

wherein P, Q and R are as hereinbefore defined.

All the steroidal final products of this invention (i.e., compounds of Formula A) are physiologically active substances which possess progestational activity when administered either perorally or parenterally, and hence the compounds of this invention can be used in the treatment of such diseases and conditions as habitual or threatened abortion, amenorrhea, metropathic hemorrhagica, dysmenorrhea, inadequate corpus luteum function, and premenstrual tension, being formulated for such administration in the usual perorally or parenterally acceptable formulations.

The following examples illustrate the invention (all temperatures being in centigrade):

EXAMPLE I

*6β-fluoropregnane-5α,16α,17α-triol-3,20-dione 3,20-bisethylene ketal 16α,17α-cycloborate*

(A) *5α,6α-epoxypregnane-16α,17α-diol-3,20-bisethylene ketal and 5β,6β-epoxypregnane-16α,17α-diol-3,20-bisethylene ketal.*—To a solution of 4.35 grams (10 millimoles) of 16α,17α-dihydroxyprogesterone 3,20-bisethylene ketal [prepared as described in J.A.C.S., 78, 1909, (1956)] in 100 ml. of chloroform is added at 0° over a period of ten minutes 40 ml. of a .5 N solution of monoperphthalic acid in ether. [The latter solution was prepared as described in The Journal of the American Chemical Society, vol. 77, page 3406 (1955).] The reaction mixture is allowed to remain at 0° for 16 hours following which it is poured with stirring into an ice-cold solution of 5 grams of sodium carbonate in 100 ml. of water. After separation of the layers, the chloroform solution is washed with water, dried over sodium sulfate and the solvents removed in vacuo. The residual solid consists of a mixture of the 5α,6α- and 5β,6β-epoxides. Separation of the two epoxides is achieved by recrystallization from acetone from which the α-epoxide separates first as the less soluble component. The pure α-epoxide after recrystallization from acetone has the following properties: M.P. about 260–262°, $[\alpha]_D^{23}$ −56° (c, .62 in chlf.).

*Analysis.*—Calc'd for $C_{25}H_{38}O_7$: C, 66.64; H, 8.50. Found: C, 66.53; H, 8.46.

The 5β-epoxide after recrystallization from acetone has the following properties: M.P. about 175–178°, $[\alpha]_D^{23}$ −10.1° (c, .62 in chlf.). The yield of the α-epoxide is approximately 56% of theory, that of the β-epoxide approximately 20% of theory.

(B) *Preparation of 6β-fluoropregnane-5α,16α,17α-triol-3,20-dione 3,20-bis-ethylene ketal 16α,17α-cycloborate.*—To a clear solution of 1 g. of 5α,6α-epoxy-16α,17α-dihydroxyprogesterone 3,20-bisethylene ketal in 300 ml. of a 1:1 benzene:ether mixture, is added 7.5 ml. of freshly distilled borontrifluoride etherate. This mixture is stirred at room temperature for 3 hours, after which it is successively washed with distilled water, sodium bicarbonate solution and distilled water. The organic layer is then dried over sodium sulfate, filtered, evaporated to dryness and dried under vacuum. This material represents 6β-fluoropregnane-5α,16α,17α-triol-3,20-dione 3,20-bisethylene ketal 16α,17α-cycloborate.

$\lambda_{max}^{Nujol}$ broad 2.9 to 3.1 μ weak 5.8 to 5.95μ shoulder at 6.2μ; strong 6.62 and 9.5 mμ.

*Analysis.*—Calc'd for $C_{25}H_{38}O_8BF$: F, 3.82; B, 2.18; neut. equiv., 496. Found: F, 3.39; B, 2.02; neut. equiv., 505.

EXAMPLE II

*Methyl 6β-fluoropregnane-5α,16α,17α-triol-3,20-dione 3,20-bisethylene ketal 16α,17α-cycloborate*

About 3 gms. of 6β-fluoropregnane-5α,16α,17α-triol-3,20-dione 3,20-bisethylene ketal 16α,17α-cycloborate is dissolved in cold methanol and kept at room temperature for several hours, whereupon crystals (needles) separate out. These are filtered, washed with cold methanol and dried under vacuum. About 3 g. of crystalline material is obtained. An analytical sample is prepared by slowly concentrating a cold methanol solution of the crystals at room temperature and washing the resulting crystals carefully with fresh methanol. It has the following properties: M.P. about 267° (dec.)

$\lambda_{max}^{Nujol}$ 2.89 and 6.67 mμ

*Analysis.*—Calc'd for $C_{27}H_{44}O_9BF$: C, 59.78; H, 8.18; B, 1.99; F, 3.50; $OCH_3$, 11.44. Found: C, 60.26; H, 7.84; B, 1.81; F, 3.29; $OCH_3$, 10.96; neut. equiv. 0.0

EXAMPLE III

*Preparation of 6β-fluoropregnane-5α,16α,17α-triol-3,20-dione by hydrolysis of 6β-fluoropregnane-5α,16α,17α-triol-3,20-dione 3,20-bisethylene ketal 16α,17α-cycloborate with sulfuric acid in methanol*

A solution of 1 g. of 6β-fluoropregnane-5α,16α,17α-triol-3,20-dione 3,20-bisethylene ketal 16α,17α-cycloborate and 3.0 ml. of 8% sulfuric acid (w./v.) in 30 ml. of methanol is heated to reflux for 15 minutes. The solution is diluted with water and neutralized with sodium bicarbonate solution. It is then concentrated in vacuo until most of the methanol is removed. The residual solution is extracted with methyl isobutyl ketone, the organic extract washed with water, dried over sodium sulfate and evaporated to dryness in vacuo. The residual material (about 720 mg.) after crystallization from acetone-hexane furnishes about 510 mg. of crystalline material M.P. about 160–180°. Recrystallization from methanol furnishes about 154 mg. of pure 6β-fluoropregnane-5α,16α,17α-triol-3,20-dione of the following properties: M.P. about 234–235°

$\lambda_{max}^{Nujol}$ 3.00, 5.87 and 5.95 mμ. $\lambda_{max}^{alc.}$ 290 mμ (ϵ=400)

*Analysis.*—Calc'd for $C_{21}H_{31}O_5F$: C, 65.93; H, 8.27; F, 4.97. Found: C, 65.85; H, 8.35; F, 4.79.

EXAMPLE IV

*Preparation of 6β-fluoropregnane-5α,16α,17α-triol-3,20-dione by hydrolysis of methyl 6β-fluoropregnane-5α,16α,17α-triol-3,20-dione 3,20-bisethylene ketal 16α,17α-cycloborate with sulfuric acid in methanol*

A solution of 1.3 g. of the compound of Example II and 4 ml. of 8% sulfuric acid (w./v.) in 40 ml. of methanol is heated to reflux for 15 minutes. The solution is diluted with water and concentrated in vacuo until most of the methanol is removed. The residual suspension is diluted with more water whereupon a heavy precipitate forms. This is filtered, washed with water and dried in vacuo. There is obtained about 770 mg. of pure 6β-fluoropregnane-5α,16α,17α - triol - 3,20 - dione melting at about 230–235°. (85% of theory). The infrared spectrum of this material is identical with that obtained in Example III. The overall yield from the oxido compound of Example I, part A via the borate ester is about 47%.

EXAMPLE V

*Preparation of 6β-fluoropregnane-5α,16α,17α - triol - 3,20-dione 16α,17α-acetonide by the acetonation of 6β-fluoropregnane-5α,16α,17α-triol-3,20-dione*

To a solution of 212 mg. of 6β-fluoropregnane-5α,16α,17α-triol-3,20-dione in 20 ml. of acetone, is added 0.02 ml. of 70% perchloric acid and the mixture allowed to remain at room temperature with stirring for 2 hours. After neutralization with sodium bicarbonate solution and addition of water the bulk of the acetone is removed in vacuo. The resulting precipitate is filtered, washed with water and dried in vacuo. There is obtained about 206 mg. of the acetonide melting at about 259–264° C. Recrystallization from acetone-hexane furnishes the pure 6β-fluoropregnane-5α,16α,17α-triol - 3,20 - dione 16α,17α-acetonide having the following properties: M.P. about 268–271°; $[\alpha]_D^{23}$+55° (c, .67 in chlf.);

$\lambda_{max}^{Nujol}$ 2.94, 5.85, 5.91 mμ; $\lambda_{max}^{alc.}$ no selective absorption

*Analysis.*—Calc'd for $C_{24}H_{35}O_5F$: C, 68.22; H, 8.35; F, 4.49. Found: C, 68.09; H, 8.13; F, 4.73.

EXAMPLE VI

*Preparation of 6β-fluoropregnane-5α,16α,17α - triol - 3,20-dione 16α,17α-acetonide by simultaneous hydrolysis and acetonation of methyl 6β - fluoropregnane - 5α,16α,17α-triol-3,20-dione-3,20-bis-ethylene ketal 16α,17α - cycloborate*

To a solution of 240 mg. of the cycloborate of Example II in 25 ml. acetone, is added 0.025 ml. of 70% perchloric acid, and the mixture is stirred at room temperature for 2 hours. The reaction mixture is then neutralized with dilute sodium bicarbonate, diluted with water and the bulk of the acetone removed in vacuo. The resulting precipitate is filtered, washed well with water and dried in vacuo. There is obtained about 100 mg. of crude acetonide melting at about 220–225°. Several recrystallizations from acetone-hexane raise the melting point to about 250°. An ultraviolet spectrum of the mother liquor shows the presence of a small amount (10%) of a Δ⁴-3-keto compound, while an infrared spectrum of the crystalline material shows it to be the desired pure acetonide.

EXAMPLE VII

*Preparation of acetophenone derivative of 6β-fluoro-pregnane-5α,16α,17α-triol-3,20-dione*

To a suspension of 100 mg. of 6β-fluoro-5α,16α,17α-trihydroxypregnane-3,20-dione in 2 ml. of freshly distilled acetophenone, is added with stirring 0.01 ml. of 70% perchloric acid. The suspension clears within 5 minutes, and the reaction is allowed to proceed for an additional 30 minutes. This mixture is neutralized with dilute sodium bicarbonate solution; and after the addition of water, extracted with chloroform. The chloroform extract is washed with water, dried over sodium sulfate, filtered and evaporated to dryness in a high vacuum to remove residual acetophenone. The crude product shows an ultraviolet absorption spectrum at 234 mμ with a molar extinction co-efficient of 4,000 indicating partial dehydration to the Δ⁴-3-ketone. It is used in the process of Example IX, without further purification.

EXAMPLE VIII

*Preparation of 6β-fluoro-16α,17α-dihydroxyprogesterone-16α,17α-acetonide by dehydration of 6β-fluoropregnane-5α-16α-17α-triol-3,20-dione 16α,17α-acetonide with sodium hydroxide in ethanol*

To a solution of 140 mg. of 6β-fluoropregnane -5α,16α,17α-triol-3,20-dione 16α,17α-acetonide in 30 ml. of 95% ethanol is added 1.5 ml. of 0.1 N sodium hydroxide. The mixture is allowed to stand at room temperature for 18 hours, following which it is neutralized with acetic acid, diluted with water and concentrated in vacuo. After cooling, the crystals are separated by filtration, washed thoroughly with water and dried in vacuo. There is obtained about 108 mg. of 6β-fluoro - 16α,17α - dihydroxyprogesterone 16α,17α-acetonide melting at 227–230° C. Crystallization from methanol furnishes a pure sample with the following properties: M.P. about 237–238°; $[\alpha]_D^{23}+43.3°$ (c, .90 in chlf.);

$\lambda_{max.}^{alc.}$ 232 mμ ($\epsilon=11,700$); $\lambda_{max.}^{Nujol}$ 5.85, 5.95, 6.20 mμ

*Analysis.*—Calc'd for $C_{24}H_{34}O_4F$: C, 71.26; H, 8.22; F, 4.70. Found: C, 71.29; H, 8.13; F, 4.79.

EXAMPLE IX

*Preparation of acetophenone derivative of 6β-fluoro-16α,17α-dihydroxyprogesterone by dehydration of the acetophenone derivative of 6β - fluoropregnane - 5α,16α,17α-triol-3,20-dione with sodium hydroxide*

A solution of the acetophenone derivative of 6β-fluoropregnane - 5α,16α,17α - triol - 3,20 - dione obtained as described in Example VII in 10 ml. of 95% ethanol and 1 ml. 0.1 N NaOH is treated as described in Example VIII. The resulting dehydration product is purified by chromatography on alumina to yield the desired acetophenone derivative of 16α,17α-dihydroxyprogesterone.

EXAMPLE X

*Preparation of 6α-fluoro-16α,17α-dihydroxyprogesterone 16α,17α - acetonide by epimerization of 6β - fluoro-16α, 17α-dihydroxyprogesterone 16α,17α-acetonide*

Into 5 ml. of glacial acetic acid is passed at 10° C. a rapid stream of hydrogen chloride gas for a period of 30 minutes. During this period of time, the temperature of the bath is lowered to 5°. This solution is placed in an ice bath and there is added 50 mg. of 6β-fluoro-*16α,17α*-dihydroxyprogesterone 16α,17α-acetonide. The resulting solution is kept at 2 to 3° for 2 hours, after which it is diluted with water and extracted with chloroform. The chloroform extract is washed successively with water, sodium bicarbonate solutiton and water, dried over sodium sulfate and evaporated to dryness in vacuo. The residual material (about 48 mg.) is purified by chromatography on 2.5 grams of neutral alumina. Elution of the column with hexane:benzene 1:1 (150 ml.) and benzene alone (75 ml.) furnishes about 10 mg. of the 6α-fluoro derivative. Recrystallization from acetone-hexane furnishes the pure epimer of the following properties: M.P. about 252–253°, $[\alpha]_D^{23}+114°$ (c, 1.12 in chlf.)

$\lambda_{max.}^{Nujol}$ 5.84, 5.93, 6.10 mμ. $\lambda_{max.}^{alc.}$.

*Analysis.*—Found: C, 71.37; H, 8.22; F, 4.71. Calc'd: C, 71.25; H, 8.22; F, 4.70.

EXAMPLE XI

*Preparation of the acetophenone derivative of 6α-fluoro-16α,17α-dihydroxyprogesterone by epimerization of the acetophenone derivative of 6β-fluoro-16α,17α-dihydroxyprogesterone*

Following the procedure of Example X, the 6β-fluoroacetophenone derivative is treated with hydrogen chloride gas in glacial acetic acid and the reaction mixture allowed to stand. The reaction mixture is diluted with water, extracted with chloroform, etc. to give a residue which is purified by chromatography on neutral alumina. Elution of the column yields the desired 6α-fluoro-epimer.

EXAMPLE XII

*Preparation of 6α-fluoro-16α,17α-dihydroxyprogesterone-16α, 17α-acetonide by simultaneous dehydration and epimerization of 6β-fluoropregnane-5α,16α,17α-triol-3, 20-dione 16,17α-acetonide*

Following exactly the procedure of Example X, but substituting 6β - fluoropregnane - 5α,16α,17α - triol -3,20-dione-16α,17α-acetonide for the 6β-fluoro-16α,17α-dihydroxyprogesterone - 16α, 17α - acetonide, 6α - fluoro-16α,17α-dihydroxyprogesterone-16α,17α-acetonide of the same properties is formed.

EXAMPLE XIII

*Preparation of 6β-chloropregnane-5α,16α,17α-triol-3-20-dione-3,20-bisethylene ketal 16α,17α-cycloborate*

Following the procedure of Example IB, except for the substitution of boron trichloride, for the boron trifluoride, 6β - chloropregnane - 5α,16α,17α - triol - 3,20 - dione 3,20-bisethylene ketal 16α,17α-cycloborate is formed.

EXAMPLE XIV

*Preparation of 6β-chloropregnane-5α,16α,17α-triol-3,20-dione*

Following the procedure of Example III, the product of Example XIII is refluxed in a mixture of methanol and 8% sulfuric acid. Upon extraction and recrystallization, the desired 6β-chloropregnane-5α,16α,17α-triol-3, 20-dione is obtained.

EXAMPLE XV

*Preparation of 6β-chloropregnane-5α,16α,17α-triol-3,20-dione 16α,17α-acetonide*

The product of Example XIV is acetonated in accordance with the procedure of Example V by treatment with a mixture of acetone and 70% perchloric acid to yield the desired 6β-chloropregnane 5α,16α,17α-triol-3,20-dione 16α,17α-acetonide.

EXAMPLE XVI

*Preparation of 6α-chloro-16α,17α-dihydroxyprogesterone 16α,17α-acetonide*

The 6β-chloro-triol acetonide prepared in accordance with Example XV is simultaneously dehydrated and epimerized at the 6-position in accordance with the procedure of Example X by treatment with hydrogen chloride and glacial acetic acid to yield 6α-chloro-16α,17α- dihydroxyprogesterone 16α,17α-acetonide. 6β-chloro-16α,17α - dihydroxyprogesterone 16α,17α - acetonide can be prepared from the same starting material by treatment with 0.005 N sodium hydroxide in accordance with the procedure of Example VIII.

EXAMPLE XVII

*16α,17α-(2'-butylidene) 5α,16α,17α-trihydroxy 6β-fluoropregnane-3,20-dione*

To a suspension of 100 mg. of 5α,16α,17α-trihydroxy-6β-fluoropregnane-3,20-dione in 15 ml. of methylethylketone is added 0.05 ml. of 72% perchloric acid, and the mixture stirred at room temperature for two hours. The resulting solution is neutralized with sodium bicarbonate solution and after addition of water the methylethylketone is evaporated in vacuo. The resulting crystals are filtered, washed with water and dried in vacuo. Recrystallization from acetone-hexane gives the pure isobutylidene derivative.

EXAMPLE XVIII

*16α,17α-(4'-methyl-2'-pentylidene) 5α,16α,17α-trihydroxy-6β-chloropregnane-3,20-dione*

To a suspension of 100 mg. of 5α,16α,17α-trihydroxy-6β-chloropregnane-3,20-dione in 15 ml. of methylisobutylketone, is added 0.05 ml. of 72% perchloric acid. The mixture is stirred at room temperature for 6 hours and the resulting solution extracted with dilute sodium bicarbonate solution, washed with water, the organic phase dried over sodium sulfate and the solvent evaporated in vacuo. Recrystallization of the resulting crystals from acetone-hexane gives the pure isohexylidene derivative.

EXAMPLE XIX

*16α,17α-cyclohexylidene 5α,16α,17α-trihydroxy 6β-fluoropregnane-3,20-dione*

A suspension of 200 mg. of 5α,16α,17α-trihydroxy-6β-fluoropregnane-3,20-dione in 15 ml. of redistilled cyclohexanone is treated for two hours as described in Example XVIII.

EXAMPLE XX

*16α,17α-(3'-pentylidene)5α,16α,17α-trihydroxy-6β-pregnane-3,20-dione*

A suspension of 200 mg. of 5α,16α,17α-trihydroxy-6β-fluoropregnane-3,20-dione in 30 ml. of diethylketone is treated for four hours as described in Example XVIII.

EXAMPLE XXI

*16α,17α-ethylidene 5α,16α,17α-trihydroxy-6β-fluoropregnene-3,20-dione*

To a suspension of 200 mg. 5α,16α,17α-trihydroxy-6β-fluoropregnane-3,20-dione in 15 ml. of freshly distilled paraldehyde, is added 0.05 ml. of 72% perchloric acid and the mixture agitated for 3.5 hours at room temperature. The resulting solution is extracted with dilute bicarbonate and water, dried, and the excess paraldehyde removed in vacuo. The residual material represents 16α,17α-ethylidene 5α,16α,17α-trihydroxy-6β-fluoropregnane-3,20-dione.

EXAMPLE XXII

*16α,17α-chloral derivative of 5α,16α,17α-trihydroxy-6β-chloropregnane-3,20-dione*

A suspension of 500 mg. of 5α,16α,17α-trihydroxy-6β-chloropregnane-3,20-dione and 4 gm. of chloral hydrate in 20 ml. of dioxane is agitated at room temperature for 24 hours. The mixture is filtered, neutralized with aqueous sodium bicarbonate and extracted with chloroform. The chloroformdioxane phase is dried over sodium sulfate, the solvent removed in vacuo and the residual chloral derivative crystallized from methanol.

EXAMPLE XXIII

*16α,17α-(1,1,1-trifluoroisopropylidene)5α,16α,17α-trihydroxy-6β-chloropregnane-3,20-dione*

Following the procedure of Example XXII, but replacing the chloral hydrate used in that example by a mixture of 5 ml. of dioxane and 5 ml. of 1,1,1-trifluoroacetone there is obtained the trifluoroisopropylidene derivative.

EXAMPLE XXIV

*Benzaldehyde derivative of 5α,16α,17α-trihydroxy-6β-fluoropregnane-3,20-dione*

To a suspension of 100 mg. of 5α,16α,17α-trihydroxy-6β-fluoropregnane-3,20-dione in 15 ml. of benzaldehyde, is added 0.05 ml. of 72% perchloric acid. The mixture is treated as in Example XXII and results in the formation of the benzaldehyde derivative of 5α, 16α,17α-trihydroxy-6β-fluoropregnane-3,20-dione.

EXAMPLE XXV

*Furfural derivative of 5α,16α,17α-trihydroxy-6β-fluoropregnane-3,20-dione*

Treatment of 5α,16α,17α-trihydroxy-6β-fluoropregnane-3,20-dione with furfural in the presence of perchloric acid according to the procedure of Example XXII results in the formation of the furfural derivative of 5α,16α,17-trihydroxy-6β-fluoropregnane-3,20-dione.

EXAMPLE XXVI

*Dicyclopropyl ketone derivative of 5α,16α,17α-trihydroxy-6β-chloropregnane-3,20-dione*

Following the procedure of Example XXII, but replacing the trifluoroacetone by dicyclopropyl ketone, there is obtained the dicyclopropyl derivative of 5α,16α,17α-trihydroxy-6β-chloropregnane-3,20-dione.

EXAMPLE XXVII

*Preparation of 16α,17α-(2'-butylidene)16α,17α-dihydroxy-6β-fluoroprogesterone*

A solution of the product of Example XVII in ethanol is treated with sodium hydroxide in accordance with the procedure of Example VIII to yield as the final product 16α,17α - (2' - butylidene) 16α,17α - dihydroxy - 6β - fluoroprogesterone.

The 6α-fluoro analogue is readily obtained by treating the same starting material in accordance with the epimerization procedure of Example X.

EXAMPLE XXVIII

*Preparation of 16α,17α(4'-methyl-2'-pentylidene) 6β-chloro-16α,17α-dihydroxyprogesterone*

The product of Example XVIII is dehydrated in accordance with the dehydration procedure of Example VIII to yield the desired product.

The 6α-chloro analogue is readily obtained by subjecting the same starting material to the epimerization procedure described in Example X.

EXAMPLE XXIX

*Preparation of 16α,17α-cyclohexylidene16α,17α-dihydroxy-6β-fluoroprogesterone*

The final product of Example XIX is converted following the procedure of Example XXVIII. There is respectively obtained the 6β-fluoro and 6α-fluoro derivatives of 16α,17α-cyclohexylidene-16α,17α-dihydroxyprogesterone.

EXAMPLE XXX

*Preparation of 16α,17α-(3'-pentylidene)16α,17α-dihydroxy-6β-fluoroprogesterone*

Following the dehydration procedure of Example VIII using as a starting material the final product of Example XX there is obtained 16α,17α-(3'-pentylidene) 16α,17α-dihydroxy-6β-fluoroprogesterone.

The corresponding 6α-fluoro analogue is obtained by subjecting the final product of Example XX to the epimerization procedure of Example X.

In the same manner as in Example XXX, the products of Examples XXI through XXVI are converted to their dehydrated and epimerized analogues having the group of the 6-position in the β and α configuration by treatment respectively in accordance with the procedures of Examples VIII and X.

The invention may be variously otherwise embodied within the scope of the appended claims.

What is claimed is:

1. A steroid of the general formula

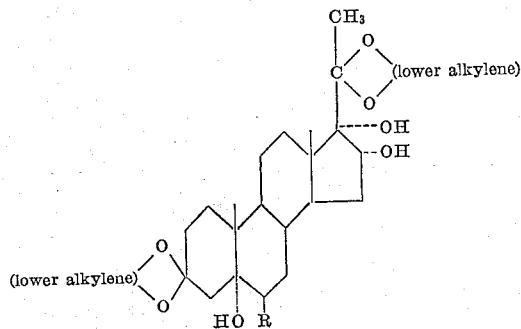

wherein R is a halogen selected from the group consisting of fluorine and chlorine.

2. 5α,16α,17α-trihydroxy-6β-fluoropregnane 3,20-bis-ethylene ketal.

References Cited
UNITED STATES PATENTS

| | | | |
|---|---|---|---|
| 2,838,496 | 6/1958 | Babcock et al. | 260—239.55 |
| 2,838,528 | 6/1958 | Campbell et al. | 260—397.3 |
| 2,838,540 | 6/1958 | Campbell et al. | 260—397.45 |
| 2,881,168 | 4/1959 | Spero et al. | 260—239.55 |
| 2,941,997 | 6/1960 | Fried | 260—239.55 |
| 3,021,347 | 2/1962 | Allen et al. | 260—397.45 |

OTHER REFERENCES

Cooley et al., J. Chem. Soc. (London), December 1955, pages 4373–4377 (pages 4374 and 4376 necessary).

Fried et al., J. Am. Chem. Soc., vol. 80 (May 5, 1958), pages 2338 and 2339.

Mills et al., J. Am. Chem. Soc., vol. 81 (Mar. 5, 1959).

ELBERT L. ROBERTS, *Primary Examiner.*

L. H. GASTON, M. LIEBMAN, LEWIS GOTTS,
*Examiners.*

T. J. MORGAN, G. E. LANDE, *Assistant Examiners.*

UNITED STATES PATENT OFFICE
CERTIFICATE OF CORRECTION

Patent No. 3,341,525                             September 12, 1967

Josef Fried

It is hereby certified that error appears in the above numbered patent requiring correction and that the said Letters Patent should read as corrected below.

Column 1, line 55, after formula "B." insert -- with a peracid, such as perbenzoic acid, monoperphthalic acid and peracetic acid, to yield the $5\alpha,6\alpha$-epoxy derivatives having the formula --; column 3, line 18, for "hereinafter" read -- hereinbefore --; column 8, line 1, for "solutiton" read -- solution --.

Signed and sealed this 1st day of October 1968.

(SEAL)
Attest:

Edward M. Fletcher, Jr.                                  EDWARD J. BRENNER
Attesting Officer                                              Commissioner of Patents